United States Patent [19]

Polster et al.

[11] Patent Number: 4,997,410
[45] Date of Patent: Mar. 5, 1991

[54] HYDRAULIC TIGHTENING APPARATUS

[75] Inventors: Rudolf Polster, Baiersdorf; Werner Schmidt, Herzogenaurach, both of Fed. Rep. of Germany

[73] Assignee: INA Walzlager Schaeffler KG, Fed. Rep. of Germany

[21] Appl. No.: 494,137

[22] Filed: Mar. 14, 1990

Related U.S. Application Data

[63] Continuation-in-part of Ser. No. 187,343, Apr. 28, 1988, abandoned.

[30] Foreign Application Priority Data

May 6, 1987 [DE] Fed. Rep. of Germany ....... 3715038

[51] Int. Cl.$^5$ .............................................. F16H 7/08
[52] U.S. Cl. ...................................... 474/110; 474/138
[58] Field of Search .................... 474/110, 111, 138; 92/89, 90; 188/298; 267/64.26

[56] References Cited

U.S. PATENT DOCUMENTS

| 2,703,019 | 3/1955 | Burawoy et al. | 474/110 |
| 3,626,776 | 12/1971 | Staudinger et al. | 474/111 |
| 3,710,634 | 1/1973 | Tamaru et al. | 474/111 |
| 4,539,001 | 9/1985 | Okabe | 474/138 |
| 4,543,079 | 9/1985 | Matsuda et al. | 474/111 |
| 4,674,996 | 6/1987 | Anno et al. | 474/110 |
| 4,790,801 | 12/1988 | Schmidt et al. | 474/110 |

FOREIGN PATENT DOCUMENTS

| 0512036 | 6/1952 | Belgium . |
| 0063376 | 4/1982 | European Pat. Off. . |
| 0106325 | 10/1983 | European Pat. Off. . |
| 0195945 | 2/1986 | European Pat. Off. . |
| 0958070 | 2/1947 | Fed. Rep. of Germany . |
| 0849938 | 7/1949 | Fed. Rep. of Germany . |
| 3211095 | 3/1982 | Fed. Rep. of Germany . |
| 3639389 | 11/1986 | Fed. Rep. of Germany . |
| 1474011 | 1/1966 | France . |
| 2175750 | 2/1973 | France . |
| 0484128 | 5/1938 | United Kingdom . |

Primary Examiner—Robert J. Oberleitner
Attorney, Agent, or Firm—Bierman and Muserlian

[57] ABSTRACT

A hydraulic actuating element particularly for a belt tightener having a pressure chamber arranged behind a piston guided in a cylinder, a reservoir separated from the pressure chamber by a check valve, the cylinder and the reservoir being completely oil filled, the outside of the reservoir being defined by a bellows, a leakage gap between the piston and the cylinder being open towards the reservoir and at its one side towards the pressure chamber, whereby a compression spring acts to urge apart the piston and cylinder, characterized in that the reservoir (13) surrounds the cylinder (2) and being limited by the bellows (12) at its outside, the bellows (12) being sealingly secured at one end to a base element (10) secured to the cylinder (2) and at its other end to a base element (11) secured to the piston (1), and that the leakage gap (3) at its other side (17) is externally shielded by the bellows (12) and open to the reservoir (13).

9 Claims, 1 Drawing Sheet

U.S. Patent   Mar. 5, 1991   Sheet 1 of 1   4,997,410
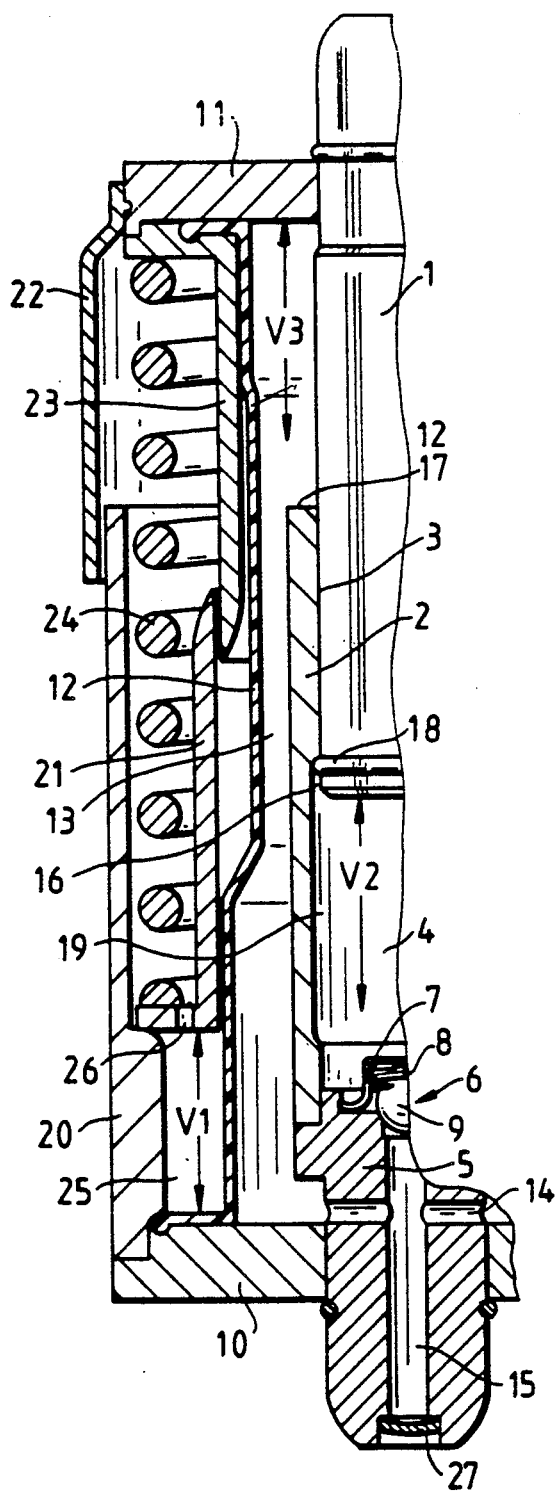
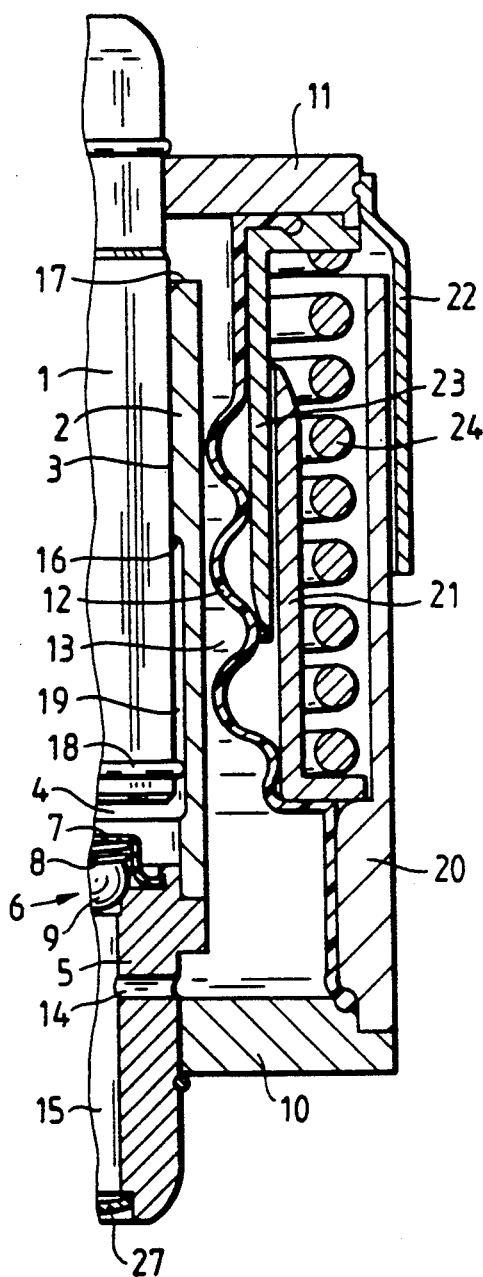

HYDRAULIC TIGHTENING APPARATUS

This is a continuation-in-part of parent application Ser. No. 07/187,343 filed Apr. 28, 1985 and now abandoned.

STATE OF THE ART

Hydraulic actuating elements particularly for belt tighteners having a pressure space provided behind a piston which is guided in a cylinder, and oil reservoir sealed against the outside by a flexible shell ad filled like the pressure space with oil and connected thereto via a check valve, and a leakage gap extending between the piston and the cylinder and being open toward the oil reservoir and at its one side toward the pressure space wherein a compression spring urges the piston out of the cylinder are known from DE-OS No. 3,211,095. In this construction, the oil reservoir is provided in the piston and therefore the flexible shell is arranged in the piston. The piston includes openings leading toward the leakage gap and arranged at the piston is a sealing ring which seals the leakage gap against the cylinder. This sealing ring is moved with the pistom movement which is undesired since oil losses will occur vial the seal due to constant heat exposure.

OBJECTS OF THE INVENTION

It is an object of the invention to provide an actuating element of the above-mentioned type which is usable independently of its position and in which oil losses via the leakage gap are avoided, and movable sealing rings become unnecessary.

This and other objects and advantages of the invention will become obvious from the following detailed description.

THE INVENTION

The novel hydraulic actuating element particularly for a belt tightener comprising a pressure chamber arranged behind a piston guided in a cylinder, a reservoir separated from the pressure chamber by a check valve, the cylinder and the reservoir being completely oil filled, the outside of the reservoir being defined by a bellows, a leakage gap between the piston and the cylinder being open towards the reservoir and at its one side towards the pressure chamber, whereby a compression spring acts to urge apart the piston and cylinder, is characterized in that the reservoir (13) surrounds the cylinder (2) and being limited by the bellows (12) at its outside, the bellows (12) being sealingly secured at one end to a base element (10) secured to the cylinder (2) and at its other end to a base element (11) secured to the piston (1), and that the leakage gap (3) at its other side (17) is externally shielded by the bellows (12) and open to reservoir (13).

The leakage gap is open only to the pressure space and to the reservoir so that a seal between the piston and the cylinder becomes redundant to prevent oil losses. The complete oil filling is thus maintained even after a long operating period. It is also advantageous that the actuating element operates independently of the fitting position and of the operating position because the oil volume is contained all-around. During operation, a pressureless volume compensation is obtained.

Since the reservoir is disposed outside the cylinder, no hollow piston has to be used. A large reservoir volume independent of the piston dimensioning is achievable which permits a large dimensioning of the stroke.

Referring now to the drawings

FIG. 1 is a cross-sectional half view of an actuating element of the invention in a relaxed state and FIG. 2 is a cross-sectional half view of the same element in a tightened state.

A piston (1) is guided within a cylinder (2) and provided between the piston (1) and the cylinder (2) is a leakage gap (3). Disposed in the cylinder (2) behind the piston (1) is a pressure space (4) and at the bottom portion (5) thereof, a check valve (6) is arranged which includes a valve cap (7), a compression spring (8) and a valve ball (9).

Mounted in a oil-tight manner outside the bottom portion (5) of the cylinder (2) is an annular disk (10). Likewise, an annular disk (11) is secured in an oil-tight manner to the piston (1). The cylinder (2) is surrounded by a bellows (12) which is sealingly mounted to the annular disk (10), on the one hand, and to the annular disk (11), on the other hand. The bellows (12) defines a reservoir (13) for the hydraulic oil which is connected with the check valve (6) via bore (14) in the bottom portion (5). A bore (15) provides the oil filling of the pressure space (4) and of the reservoir (13) and is closed in operation by a sealing cap (27).

The leakage gap (3) opens at its one side (16) into the pressure space (4) and at its other side (17) into the reservoir (13) which side (17) of the leakage gap (3) is thus shielded against the surrounding by the bellows (12). There are no sealing rings between the cylinder (2) and the piston (1) and a retainer ring (18) is located on the piston (1) for limiting the stroke. The retainer ring (18) is slidable with the piston (1) in a respective recess (19) of the cylinder (2).

Mounted outside of the annular disk (10) is an outer sleeve (20) in which a protective sleeve (21) is inserted. Mounted to the outer circumference of the annular disk (11) is an outer sleeve (22) which telescopically overlaps the outer sleeve (20). Furthermore, a protective sleeve (23) is arranged at the annular disk (11) and telescopically engages in the protective sleeve (21). Arranged between the outer sleeve (20) and the protective sleeve (21) is a compression spring (24) which may, however, also be arranged between the cylinder (2) and the protetective sleeves (21, 23) within the reservoir (13), with the bellows (12) disposed outside the protective sleeves (21,23). The protective sleeves (21,23) shield the bellows (12) against the compression spring (24). The actuating ends of the piston (1) and the cylinder (2) can be designed in any desired manner e. g. as ball end, as spherical segment or as fixing eyelet as common in shock absorbers.

The mode of operation of the described hydraulic actuating element is as follows: After completely filling the pressure space (4) and reservoir (13) with oil and when considering the position of FIG. 1, by pushing the piston (1) against the force of the compression spring (24), the check valve (6) locks and oil leaks from the pressure space (4) through the leakage gap (3) into the reservoir (13). During downward movement of the piston (1), the bellows (12) folds between the outer circumference of the cylinder (2) and the protective sleeves (21,23). The bellows (12) indents in a receiving space (25) (compare FIG. 1) which is restricted by the outer sleeve (20) and the volume (7) of the receiving space (25) is equal to the sum of the volume (V2) of the oil which is displaced from the pressure space (4) during complete depression of the piston (1) and the volume (V3) by which the reservoir (13) is shortened in the axial direction by downward movement of the piston (1). Thus, a pressureless volume compensation is attained.

In order to prevent a build up of the air counterpressure in the receiving space (25), the latter is provided with openings (26). The depression of the piston (1) is attenuated by the dimensioning of the leakage gap (3). When the compression spring (24) relaxes in teh position as shown in FIG. 1, the piston (1) slides upwardly and the check valve (6) opens and oil is drawn from the reservoir (13) into the pressure space (4). Accordingly, the diameter of the bellows (12) decreases in the area of the receiving space (25) (compare FIG. 1) and the openings (26) prevent the build up of an underpressure in the receiving space (25). The bellows (12) expands in accordance with the displacement of the piston (1).

Various modifications of the element of the invention may be made without departing from the spirit or scope thereof and it is to be understood that the invention is intended to be limited only as defined in the appended claims.

What we claim is:

1. A hydraulic actuating element particularly for a belt tightener comprising a pressure chamber arranged behind a piston guided in a cylinder, a reservoir separated from the pressure chamber by a check valve, the cylinder and the reservoir being completely oil filled, the outside of the reservoir being defined by a bellows, a leakage gap between the piston and the cylinder being open towards the reservoir and at its one side towards the pressure chamber, whereby a compression spring acts to urge apart the piston and cylinder, characterized in that the reservoir surrounds the cylinder and being limited the bellows at its outside, the bellows being sealingly secured at one end to a base element secured to the cylinder and at its other end to a base element secured to the piston, and that the leakage gap at its other side is externally shielded by the bellows and open to the reservoir.

2. The element of claim 1 wherein an annular disk acting as base element is secured to the piston and the cylinder respectively to which the bellows is respectively secured in a sealing manner.

3. The element of claim 2 wherein the compression spring arranged between the cylinder and the piston surrounds the bellows.

4. The element of claim 3 wherein telescopically overlapping protective sleeves abutting on the piston and on the cylinder are inserted between the compression spring and the bellows.

5. The element of claim 2 wherein telescopically overlapping outer sleeves are arranged at the piston and the cylinder whereby the bellows and the compression spring are disposed within the outer sleeves.

6. The element of claim 1 wherein the compression spring arranged between the cylinder and the piston surrounds the bellows.

7. The element of claim 6 wherein telescopically overlaping protective sleeves abutting on the piston and on the cylinder are inserted between the compression spring and the bellows.

8. The element of claim 1 wherein a receiving space is provided in which the bellows indents during depression of the piston.

9. The element of claim 8 wherein the receiving space communicates to the outside of the actuating element by openings.

* * * * *